United States Patent [19]

Maltenieks

[11] 3,721,690
[45] March 20, 1973

[54] WATER REPELLENT COMPOSITIONS OF ORGANOTIN AND ORGANOSILICON COMPLEXES

[75] Inventor: Otto J. Maltenieks, Marietta, Ga.

[73] Assignee: Lockheed Aircraft Corporation, Burbank, Calif.

[22] Filed: July 26, 1971

[21] Appl. No.: 166,300

[52] U.S. Cl. ................................................ 260/429.7
[51] Int. Cl. ................................................ C07f 7/22
[58] Field of Search ................................... 260/429.7

[56] References Cited

UNITED STATES PATENTS 3,384,648  5/1968  Itoi ...................................... 260/429.7
3,395,164  7/1968  Leebrick ............................. 260/429.7

Primary Examiner—Partick P. Garvin
Assistant Examiner—Werten F. W. Bellamy
Attorney—Albert L. Carter et al.

[57] ABSTRACT

Water repellent compositions of chelated tin-silicon and silicon-mercaptans are disclosed which are useful as water repellent coating materials for both glass or plastic surfaces and for metal or other nontransparent surfaces. The useful lifetime of water repellent coatings made with these compositions permits their use as semi-permanent coatings for windshields, windows, and other surfaces.

10 Claims, No Drawings

WATER REPELLENT COMPOSITIONS OF ORGANOTIN AND ORGANOSILICON COMPLEXES

The invention herein described was made in the course of or under a contract with the United States Air Force.

This invention relates in general to water repellent compositions and in particular to water repellent compositions which are effective for long-term use as rain-repellent coatings on windshields, windows, or other transparent and nontransparent surfaces.

The capability of altering the water adherent nature of a surface to make the surface water repellent is of great practical value. Such products as airplane and automobile windshields, textile products, electrical equipment, and ceramics are examples of materials for which surface water-repellency is desirable. The problem presented by aircraft windshields is particularly acute since the modern turbine-powered aircraft, capable of cruising at altitudes substantially above adverse weather, is most likely to fly in rain at the very times that good vision through the windshield is critical, namely, during takeoff and landing. Conventional mechanical windshield wipers are only partially effective in removing water from the windshield of the aircraft during landing and takeoff, and the substantially higher cruising speeds which such aircraft attain at other times dictate that the windshield wiper arm and blade mechanism must be very rugged to avoid being swept away or otherwise damaged by the airstream moving past the aircraft, or else that the blade and arm mechanism must be retractable out of the airstream during non-use. Either of these alternatives would require a complex mechanism which would add unwanted weight and expense to the aircraft.

A number of water repellent compositions for application to glass or plastic surfaces, such as the windshield of an aircraft, are known in the prior art. Water repellent compositions for use on an aircraft windshield generally are either of the ground-applied type, wherein the composition is applied to the windshield while the plane is on the ground, hopefully to provide a water repellent coating which will last for at least the duration of one flight, or of the in-flight-applied type, wherein the composition has a relatively short operational lifetime on a windshield and is applied to the windshield through a suitable nozzle and dispensing system contained on the aircraft. Although the water repellent properties of some prior art coatings have been satisfactory, the useful lifetimes of such coatings are very short, with typical prior art ground-applied water repellent compositions having a useful lifetime in the order of no more than 1 hour with the aircraft flying at 150 mph in a heavy rain, and with the in-flight-applied compositions requiring renewal every few minutes during a similar flight environment.

Accordingly, it is an object of the present invention to provide an improved water repellent composition.

It is another object of this invention to provide a water repellent composition having an improved operational lifetime.

It is still another object of this invention to provide water repellent compositions which have improved adhesion to both glass and non-glass surfaces.

It is still another object of this invention to provide water repellent compositions which are resistant to fluids such as jet engine fuels, oils, and window-cleaning materials commonly used in or around aircraft.

It is yet another object of this invention to provide a water repellent composition which is easily reapplied to a surface after the effective lifetime of a prior coating has expired.

It is a further object of this invention to provide a water repellent composition having an increased operational lifetime when applied to a vehicular windshield.

Other objects and many of the attendant advantages of the present invention will be apparent from the following description and specific examples.

The water repellent composition of this invention is of the type described above as ground-applied, by which is meant a composition which is typically applied in advance of actual need and which has an operational or effectively useful lifetime sufficiently great that the water repellent coating made from the composition does not normally require renewal or replenishment at times other than normally scheduled maintenance periods.

The effectiveness of a water repellent coating on a surface is measured by the extent to which water or other liquid stands in separate droplets on a coated surface rather than spreading in a continuous film over the coated surface. A qualitative measurement of the extent to which a solid surface is wetted by a liquid is provided by measuring the contact angle, i.e., the angle between the surface and the tangent to a drop of liquid where the drop intersects with the surface. A contact angle of 0° to 5° generally indicates that a solid is completely wettable by a liquid. Surfaces with a liquid contact angle greater than 90° are generally referred to as being "water repellent."

Compositions that are effective to provide water repellent coatings which also have a substantial operational lifetime must have the dual capability of adhering to the surface to be coated and of repelling water at this surface. The formation of effective water repellent molecules is thus a difficult undertaking because good adhesive properties are exhibited by highly polar macro molecules, while water repellency is a property of nonpolar molecules. An effective water repellent composition having a contact angle generally at least of 95° and having a substantial long-term operational life-time, as discussed below, is provided according to the present invention by compositions of chelated tin-silicon and by compositions of reacted tri-chloro-silane-mercaptans or tri-chloro-silane-fluoro-carbon.

The silicon-tin chelate composition is represented by the following formula:

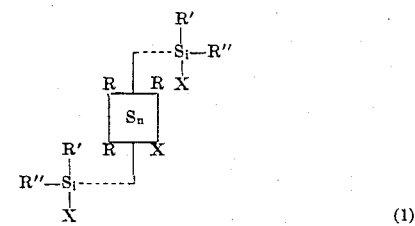

(1)

where:
R is – $(CH_2)_3CH_3$
R' is — $CH_3$

R'' is — $(CH_2)_{16}CH_3$
and
X is either all — OH or all — Cl.

A composition of formula (1) with X being all — Cl atoms is preferred for coating glass and plastic surfaces, while the composition of formula (1) with X being all — OH groups is preferred for coating other surfaces including metal and other non-metallic surfaces.

The chelate bond formation between tin vacant d-orbitals and the silicone molecule is achieved by using a catalytic amount of anhydrous cupric chloride. An appropriate stabilizing agent such as Thermolite-31 is used to promote the coating stabilization and adhesion to glass or plastic surfaces. Thermolite-31, a product of M & T Chemicals, Inc., Rahway, New Jersey, is described in U.S. Pat. No. 2,648,650.

The chloro-silane composition is represented by the following formula:

(2)

where:
R = —$(CH_2)_{13}CH_3$
R' = —S—$(CH_2)_{11}CH_3$ or

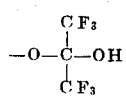

and
X = Cl or —OH.

Specific formulation and applications of the present invention are shown in the following examples:

EXAMPLE 1

A glass kettle equipped with a stirrer, a thermometer, and a reflux condenser is charged with 60 grams of methyloctadecyldichlorosilane, and 600 ml of toluene. To this mixture are added 10 grams of Thermolite-31, 20 grams of chlorotributyltin and 1 gram of anhydrous $CuCl_2$, while stirring at room temperature. After the addition of the above-mentioned compounds is completed, the temperature of the solution is raised to 110° C, and the solution is refluxed for 3 hours. The refluxed solution is cooled at room temperature and the small amount of by-products filtered off through a glass centered funnel. The toluene, which is used as reaction media, is removed by evaporation at moderately reduced pressure and the remaining product as the tin-chlorosilane chelate is used as 2 percent solution in Freon TF for water repellent coatings.

The Freon solution is placed, for convenience, into 6-ounce aerosol cans, with each can containing 600 ml of the prepared solution and a suitable Freon gas as the propellant. The water repellent solution of this example was applied to a glass surface which was previously cleaned by using water and an oil-free detergent such as Bon-Ami powder or Tide detergent. When the glass surface is completely dry, a thin film of the water repellent solution is sprayed over the entire surface while holding the aerosol can about 8 to 10 inches from the surface. After the film of water repellent solution is allowed to dry for about 5 to 8 minutes, the glass surface is polished with a soft paper until the glass appears free from excess unreacted coating material. A properly coated glass appears clean and lustrous, indicating the end point of the coating procedure.

Glass surface coated according to the foregoing procedure with the water repellent composition of Example 1 exhibited a contact angle of 98° with water drops. The useful life time of such coatings is a simulated rain rate of 1.6 inches/hour with an airspeed of 120 knots was 90–110 hours.

EXAMPLE 2

Methyloctadecyldichlorosilane in the amount of 30 grams is placed into a glass flask containing 500 ml of toluene, 5 grams of chlorotributyltin, 2 grams of Thermolite-31, and 0.200 grams of anhydrous $CuCl_2$. This solution is stirred and refluxed for 1 hour and then slowly cooled to 70° C and the formed tri-chlorosilane chelate carefully hydrolized with 100 ml of a mixture of isopropyl alcohol + 5 percent aqueous KOH solution. The hydrolized product is cooled to room temperature and transferred into a separatory funnel. The product separated into two layers, the top layer containing the hydrolized chelate compound in which the Cl-atoms are replaced by OH groups, and the bottom layer containing isopropanol-hydrochloride and other by-products. After evaporation of toluene from the top layer solution, a solidified colorless wax was isolated and identified as the hydrolized tin-silane chelate complex.

Glass and plastic surfaces coated with the water repellent solution of Example 2 and using the coating steps described in Example 1 exhibited a contact angle of 95° with water drops. The effective lifetimes of the coating in a simulated rain rate of 1.6 inches/hour with an air speed of 120 knots is approximately 48 hours.

EXAMPLE 3

Twenty-eight grams of 1-dedecanethiol, 23 grams of tetradecyltricholorsilane, and 200 ml of toluene were placed in a suitable reaction flask previously flushed with dry nitrogen. The contents of flask were stirred and warmed to 45° C. The trimethylamine was added at a slow rate (as much as consumed by the reacting mixture) into flask, and the reacting mixture was kept at the following times and temperatures: 20 minutes at 45° C, 35 minutes at 75° C, and 60 minutes at 108° C temperature. Finally, the reaction mixture was refluxed for 1 hour and then cooled to the room temperature. The trimethylamine hydrochloride which precipitated was removed by filtration, and the toluene was removed by using an evaporator at 70° C under moderate vacuum. After the evaporation of toluene, 47 grams of pale oil was obtained. This oil was placed in a vacuum oven in a large evaporation dish. A second large dish containing solid KOH pellets was also placed next to the dish containing the silicon oil, the oven was kept at 130° C, with constant removal of air by a water aspirator system. The final product obtained was 38.5 grams of thick, colorless oil.

Glass and plastic surfaces coated with the water repellent solution of Example 3 using the coating steps described in Example 1, exhibited a contact angle of 98° with water drops. The effective life-time of the coating in simulated rain rate of 2 inches/hour with an air speed of 120 knots is approximately 120 hours.

EXAMPLE 4

In a suitable reaction flask, 18.4 grams of 2,2-Dihydroxyhexa-floropropane was dissolved in 250 ml of toluene. To the stirred solution 5 grams of n-Methyldiethylamine was added, and the temperature of solution was kept at 75° C. 9.2 grams of tetradycltrichlorosilane was added through a dropping funnel. The addition of the alkyltrichlorosilane compound was finished in 1 hour. The reaction mixture was heated to reach refluxing temperature, and refluxed for 2 hours. The reaction mixture was cooled to room temperature, poured into a flask containing 20 grams of $K_2CO_3$ and dried for 24 hours. The solution was separated from precipitated byproducts by filtration. The toluene was removed by vacuum evaporation and the residue obtained as white oil which solidified at room temperature to a soft wax. A test for chlorine by infrared spectra indicated that two chlorine atoms were replaced by the hexafluoropropane radicals.

To the solvent mixture of 70 ml of Freon TF and 30 ml of 2-propanol were added 2 grams of reaction product from Example 4. The solution prepared in this manner is ready for placing in aerosol containers or usable for coatings by other means of dispensation.

Glass and plastic surfaces coated with the water repellent solution for Example 4 and using the coating steps described in Example 1, exhibited a contact angle of 98° with water drops. The effective life-time of the coating in a simulated rain rate of 2 inches/hour with an air speed of 120 knots is approximately 110 to 120 hours.

It should be understood, of course, that the foregoing relates only to preferred embodiments of the invention and that numerous modifications or alterations may be made therein without departing from the scope and the spirit of the invention as set forth in the appended claims.

What is claimed is:

1. The water repellent composition comprising:

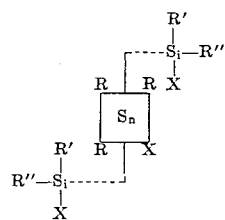

where:
R is — $(CH_2)_3 CH_3$
R' is — $CH_3$
R'' is — $(CH_2)_{16} CH_3$
and
X is either all — OH or all — Cl.

2. The composition as in claim 1, wherein X is all — Cl.

3. The composition as in claim 1, wherein X is all — OH.

4. The water repellent composition comprising:

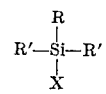

where:
R is — $(CH_2)_{13} CH_3$
R' is either — S — $(CH_2)_{11} CH_3$
or

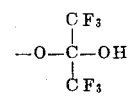

and
X is either — Cl or — OH.

5. The composition as in claim 4, wherein R' is — S — $(CH_2)_{11} CH_3$.

6. The composition as in claim 5, wherein X is — Cl.

7. The composition as in claim 5, wherein X is — OH.

8. The composition as in claim 4, wherein R' is

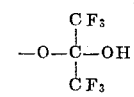

9. The composition as in claim 8 wherein X is — Cl.

10. The composition as in claim 8, wherein X is — OH.

* * * * *